(12) United States Patent
Hu et al.

(10) Patent No.: US 9,068,687 B2
(45) Date of Patent: Jun. 30, 2015

(54) SUPPORTING APPARATUS

(71) Applicant: WISTRON CORPORATION, New Taipei (TW)

(72) Inventors: Guang Hu, New Taipei (TW); Yi-Fang Yang, New Taipei (TW); Wei Gao, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 216 days.

(21) Appl. No.: 13/943,334

(22) Filed: Jul. 16, 2013

(65) Prior Publication Data

US 2014/0048674 A1 Feb. 20, 2014

(30) Foreign Application Priority Data

Aug. 20, 2012 (CN) .......................... 2012 2 0414237

(51) Int. Cl.
*A47G 29/00* (2006.01)
*F16M 13/00* (2006.01)
*F16M 11/10* (2006.01)
*F16M 11/18* (2006.01)

(52) U.S. Cl.
CPC .............. *F16M 13/00* (2013.01); *F16M 11/10* (2013.01); *F16M 11/18* (2013.01); *F16M 2200/041* (2013.01)

(58) Field of Classification Search
CPC ... F16M 11/10; F16M 11/12; F16M 2200/08; F16M 2200/06; F16M 2200/068; F16M 2200/065; F16M 13/00; F16M 11/38
USPC ............ 248/184.1, 284.1, 447, 460, 463, 371
See application file for complete search history.

(56) References Cited

U.S. PATENT DOCUMENTS

| | | | | |
|---|---|---|---|---|
| 5,165,634 | A | * | 11/1992 | Garbuzov et al. ............. 248/166 |
| 5,168,426 | A | * | 12/1992 | Hoving et al. ........... 361/679.09 |
| 5,865,414 | A | * | 2/1999 | Beitzel .......................... 248/447 |
| 6,700,775 | B1 | * | 3/2004 | Chuang et al. ........... 361/679.01 |
| 7,503,538 | B2 | * | 3/2009 | Liou et al. ..................... 248/447 |
| 2008/0048959 | A1 | * | 2/2008 | Tseng ............................. 345/87 |
| 2013/0037671 | A1 | * | 2/2013 | Iu et al. ...................... 248/286.1 |

* cited by examiner

*Primary Examiner* — Christopher Garft
(74) *Attorney, Agent, or Firm* — Muncy, Geissler, Olds & Lowe, P.C.

(57) ABSTRACT

The supporting apparatus includes a base, a device supporting portion, a device connecting portion, and a linking rod. The base includes a front end and a rear end; the device supporting portion includes a supporting element and a first rotating shaft, wherein the first rotating shaft is pivotally connected to the front end of the base and connected with the supporting element for allowing the supporting element to rotate along the first rotating shaft such that the supporting apparatus has a closed state and a first open state. When the supporting apparatus rotates to the first open state, the connecting element and the linking rod form a first connecting element opening angle $\theta_{21}$ for allowing the connecting element to connect with the first lateral surface of an electronic device and the supporting element to contact a bottom surface of the electronic device.

20 Claims, 5 Drawing Sheets

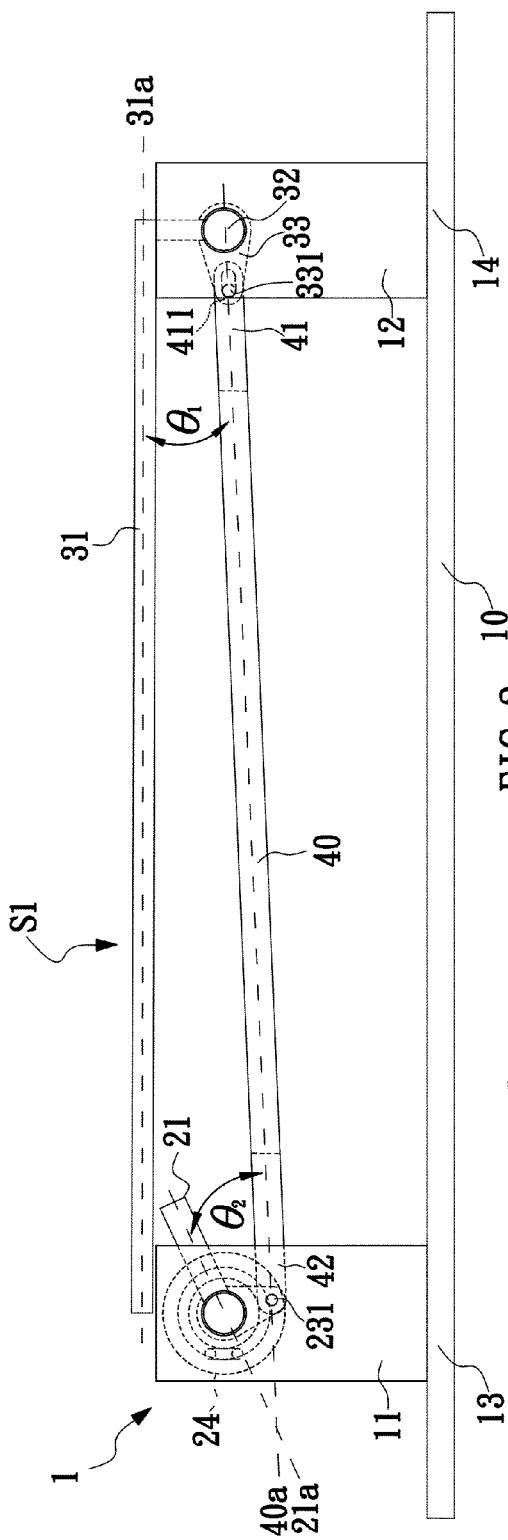
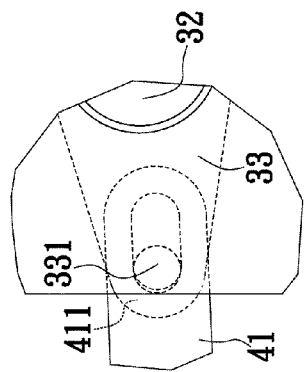
FIG. 2B
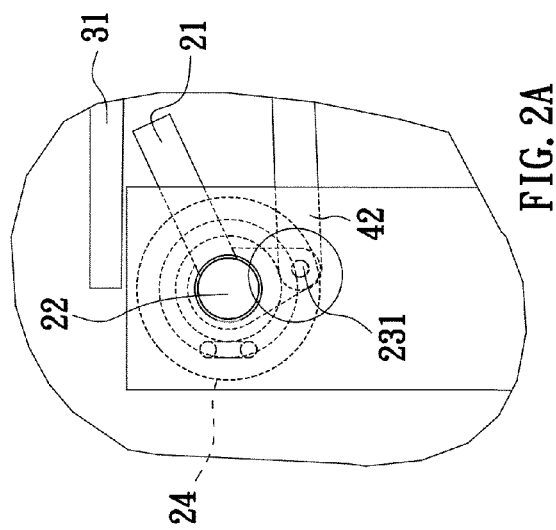
FIG. 2A
FIG. 2

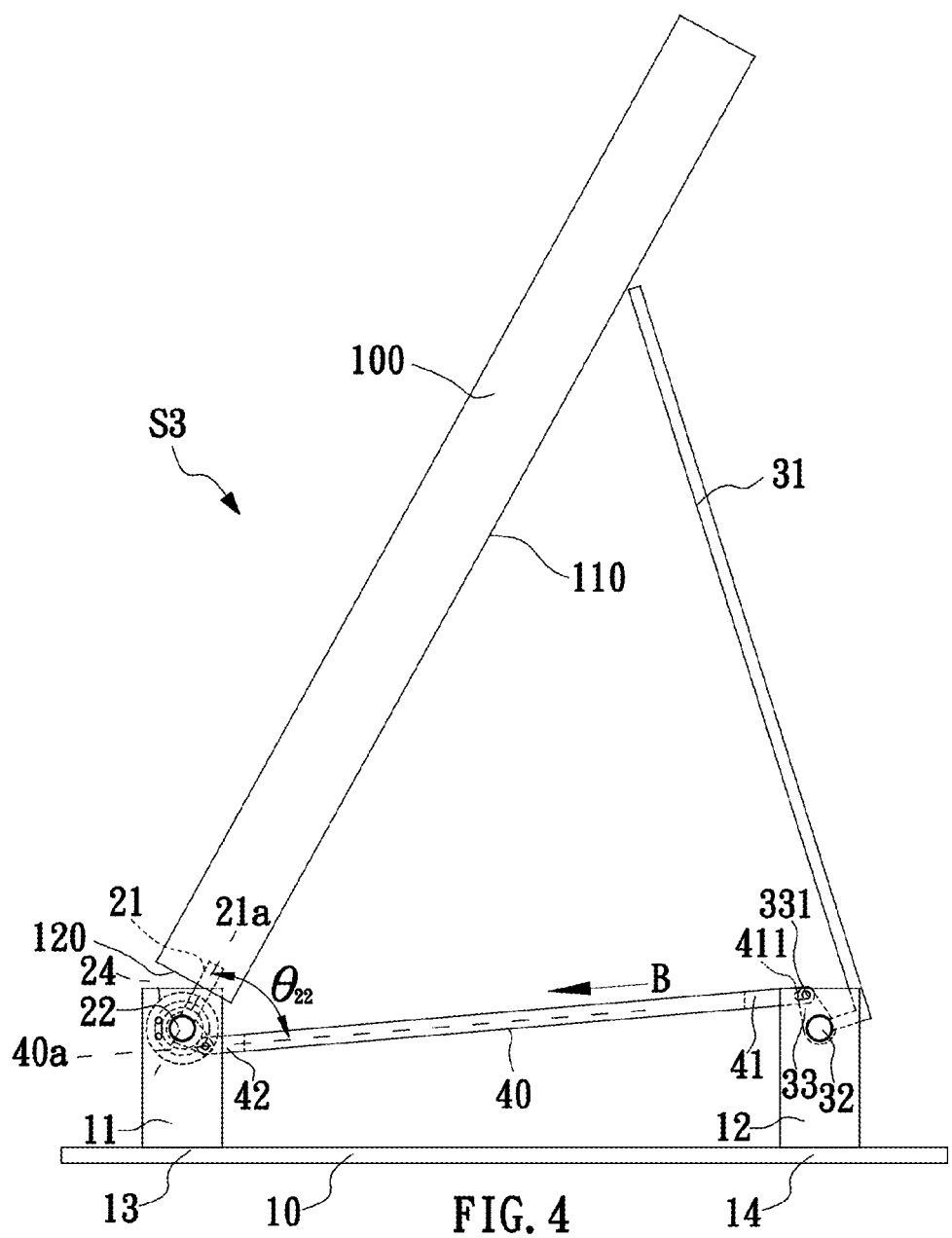
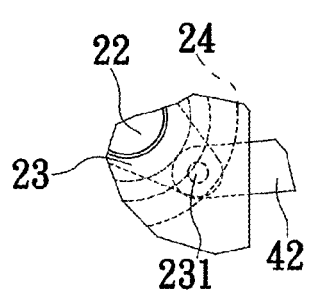
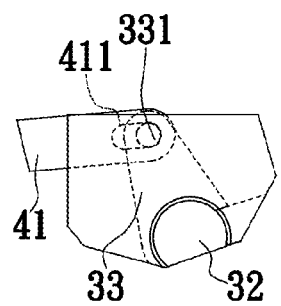
FIG. 4
FIG. 4A
FIG. 4B

SUPPORTING APPARATUS

BACKGROUND OF THE DISCLOSURE

1. Field of the Disclosure

The disclosure relates to a supporting apparatus; more specifically, the disclosure relates to a supporting apparatus capable of supporting an electronic device.

2. Description of the Related Art

As technology develops, portable electronic devices such as tablet computers or mobile phones are commonly used; therefore, various supporting apparatuses for holding portable electronic devices are available on the market. As a result, users can operate portable electronic devices comfortably for a long time with the support from the supporting apparatus.

Using a tablet computer supporting apparatus as an example, in order to connect with the built-in connector of the tablet computer, the supporting apparatus has a matched connecting element to connect with the built-in connector. In general, when the supporting apparatus needs to be connected with the tablet computer, the connecting element is exposed to the supporting apparatus for connecting with the tablet computer. However, the connecting element is still exposed to the supporting apparatus even when the tablet computer has already been detached from the supporting apparatus. The exposed connecting element not only is inconvenient for users to carry but also decreases the aesthetic appeal of the supporting apparatus.

Therefore, there is a need to provide a supporting apparatus capable of hiding the connecting element within the supporting apparatus to obviate the problem of the prior art.

SUMMARY OF THE DISCLOSURE

It is an object of the disclosure to provide a supporting apparatus that is capable of supporting an electronic device.

To achieve the abovementioned object, the supporting apparatus of the present invention comprises a base, a device supporting portion, a device connecting portion, and a linking rod. The base comprises a front end and a rear end; the device supporting portion comprises a supporting element and a first rotating shaft, wherein the first rotating shaft is pivotally connected to the front end of the base and connected with the supporting element for allowing the supporting element to rotate along the first rotating shaft such that the supporting apparatus has a closed state and a first open state. The device connecting portion comprises a connecting element, a second rotating shaft, and two torsion springs, wherein the second rotating shaft is pivotally connected to the rear end of the base and the connecting element is situated on the second rotating shaft. The two torsion springs are respectively wrapped at the two ends of the second rotating shaft. The linking rod comprises a first end and a second end, wherein the first end is pivotally connected to a first rotating shaft and the second end is pivotally connected to a second rotating shaft.

When the supporting apparatus is in the closed state, the supporting element and the linking rod form a supporting element folding angle $\theta_1$, which $0° \leq \theta_1 \leq 35°$. Meanwhile, the connecting element and the linking rod form a connecting element folding an angle $\theta_2$, which $0° \leq \theta_2 \leq 75°$. When the supporting apparatus is rotating from the closed state to the first open state, the supporting element and the linking rod form a first supporting element opening angle $\theta_{11}$, which $35° \leq \theta_{11} \leq 90°$. The connecting element and the linking rod form a first connecting element opening angle $\theta_{21}$ and $\theta_{21} > \theta_2$ so that allow the connecting element to connect with the first lateral surface of the electronic device, and the supporting element contacts the bottom surface of the electronic device. Furthermore, after the first lateral surface of the electronic device connects with the connecting element, the supporting apparatus is rotated from the first open state to a second open state. The connecting element and the linking rod together form a second connecting element opening angle $\theta_{22}$, which $\theta_2 \leq \theta_{22} \leq \theta_{21}$.

According to one embodiment of the present invention, the second connecting element opening angle $\theta_{22}$ is smaller than 90°.

According to one embodiment of the present invention, the device supporting portion further comprises a linking rod connecting portion, wherein the first end of the linking rod connects with a first rotating shaft via the linking rod connecting portion; the linking rod connecting portion further comprises a guide pin, the first end of the linking rod further comprises a hole, and the guide pin is situated inside the hole. The device connecting portion further comprises a linking rod pivoting portion, wherein the second end of the linking rod is pivotally connected to the second rotating shaft via the linking rod pivoting portion.

According to one embodiment of the present invention, the supporting element folding angle $\theta_1$ is substantially smaller than 20°; the connecting element folding angle $\theta_2$ is substantially smaller than 20°.

According to one embodiment of the present invention, the first supporting element opening angle $\theta_{11}$ is substantially 70°; a first connecting element opening angle $\theta_{21}$ is substantially 90°.

According to one embodiment of the present invention, the base further comprises a first connecting portion which is situated at the front end; the base further comprises a second connecting portion which is situated at the rear end. The first connecting portion is pivotally connected to the second rotating shaft and the second connecting portion is pivotally connected to the first rotating shaft.

BRIEF DESCRIPTION OF THE DRAWINGS

FIG. 2 illustrates a lateral view of the supporting apparatus in the closed state.

FIG. 2A illustrates a relative position between the linking rod second end and the second rotating shaft in FIG. 2.

FIG. 2B illustrates the relative position between the linking rod first end and a first rotating shaft.

FIG. 4 illustrates a lateral view of the supporting apparatus in the second open state.

FIG. 4A illustrates the relative position between the linking rod second end and second rotating shaft in FIG. 4.

FIG. 4B illustrates the relative position between the linking rod first end and a first rotating shaft in FIG. 4.

DETAILED DESCRIPTION OF THE PREFERRED EMBODIMENT

The advantages and innovative features of the disclosure will become more apparent from the following detailed descriptions when taken together with the accompanying drawings.

Figure 1:
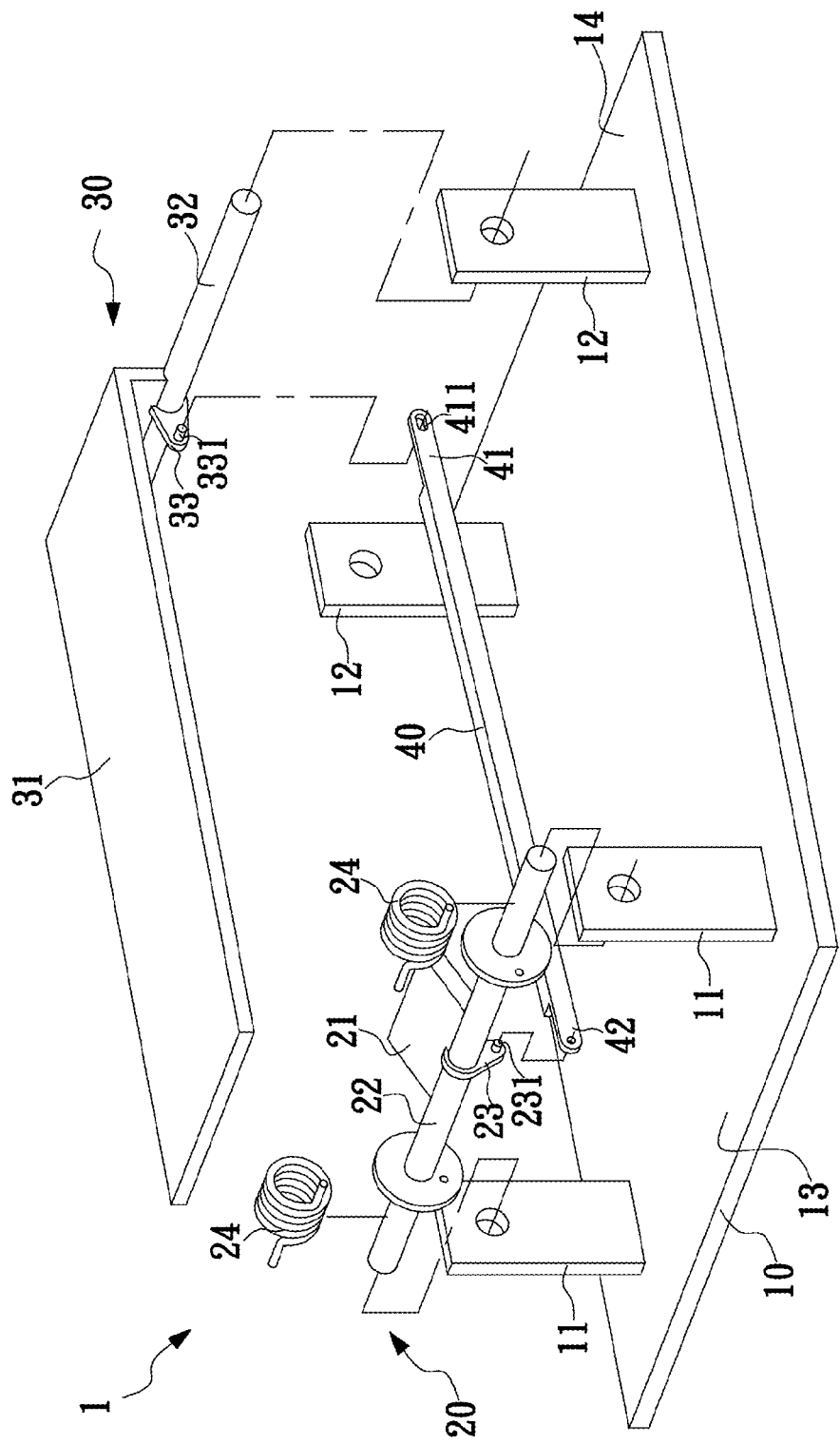
FIG. 1 illustrates an exploded view of one embodiment of the supporting apparatus of the present invention.

Please refer to FIG. 1 and FIG. 2, which are related to an embodiment of the supporting apparatus of the present invention. FIG. 1 illustrates an exploded view of one embodiment of the supporting apparatus of the present invention; FIG. 2 illustrates a lateral view of the supporting apparatus in the closed state.

As shown in FIG. 1, in this embodiment, the supporting apparatus 1 of the present invention comprises a base 10, a device connecting portion 20, a device supporting portion 30, and a linking rod 40.

The base 10 comprises a first connecting portion 11, a second connecting portion 12, a front end 13, and a rear end 14, wherein the first connecting portion 11 is situated at the front end 13 and the second connecting portion 12 is situated at the rear end 14.

The device connecting portion 20 comprises a connecting element 21, a second rotating shaft 22, a linking rod pivoting portion 23, and two torsion springs 24, wherein the linking rod pivoting portion 23 comprises a rotating shaft 231. As shown in FIG. 1, the connecting element 21 is situated on the second rotating shaft 22, and the second rotating shaft 22 is pivotally connected to the first connecting portion 11, which is located at the front end 13 of the base 10. The linking rod pivoting portion 23 is pivotally connected to the linking rod 40. The two torsion springs 24 are respectively wrapped at the two ends of the second rotating shaft 22, and the two torsion springs 24 apply a counter-clockwise torque to the connecting element 21 at all times, such that the connecting element 21 is capable of rotating counter-clockwise along the second rotating shaft 22.

As shown in FIG. 1 and FIG. 2, the device supporting portion 30 comprises a supporting element 31, a first rotating shaft 32, and a linking rod connecting portion 33, wherein the linking rod connecting portion 33 comprises a guide pin 331. The supporting element 31 connects with the first rotating shaft 32 and the first rotating shaft 32 connects with the second connecting portion 12 situated at the rear end 14 of the base 10, for allowing the supporting element 31 to rotate along the first rotating shaft 32, as an axle core; therefore, the supporting apparatus 1 can be set in a closed state S1 (FIG. 2), a first open state S2 (FIG. 3), and a second open state S3 (FIG. 4).

The linking rod 40 comprises a first end 41 and a second end 42, wherein the first end 41 of the linking rod 40 connects with the first rotating shaft 32 via the linking rod connecting portion 33. Furthermore, in this embodiment, the first end 41 further comprises a hole 411, and the guide pin 331 of the linking rod connecting portion 33 is located inside the hole 411. The second end 42 of the linking rod 40 is pivotally connected to the second rotating shaft 22 via the linking rod pivoting portion 23. In this embodiment, the second rotating shaft 22 is pivotally connected with the rotating shaft 231 of the linking rod pivoting portion 23.

Figure 3:
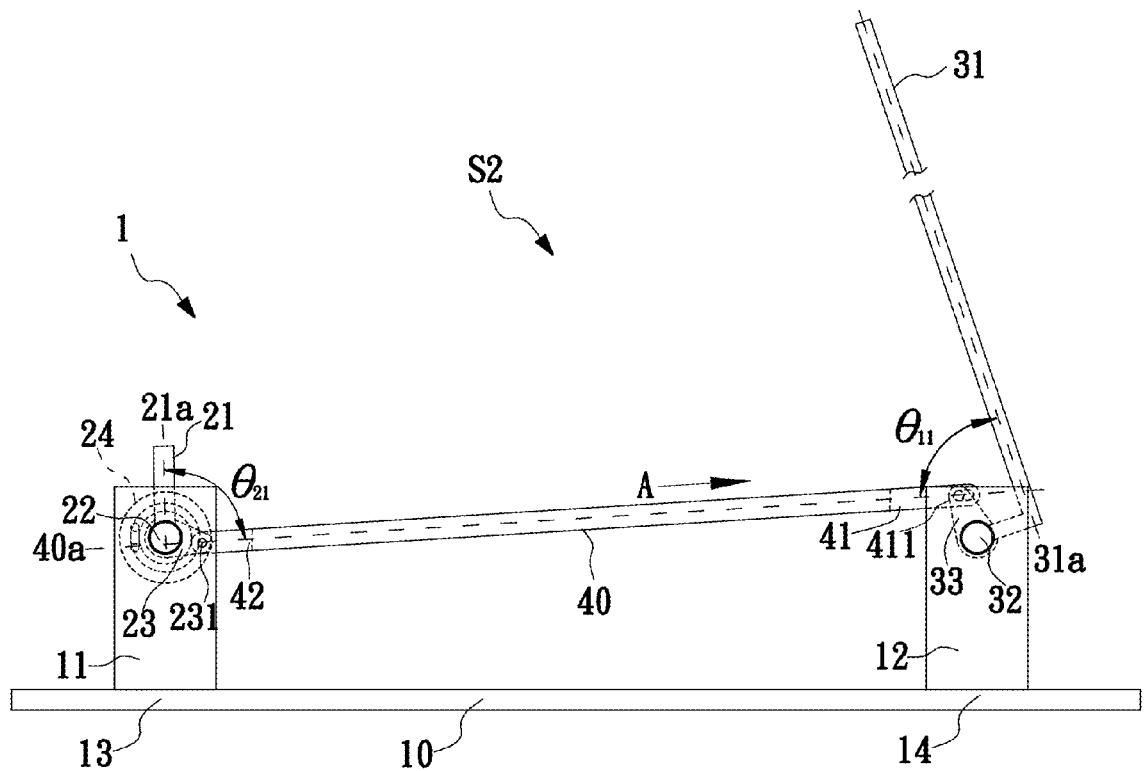
FIG. 3 illustrates a lateral view of the supporting apparatus in the first open state.
Figure 3A:
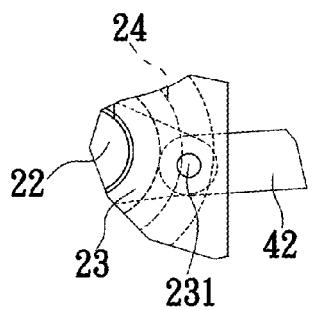
FIG. 3A illustrates the relative position between the linking rod second end and the second rotating shaft in FIG. 3.
Figure 3B:
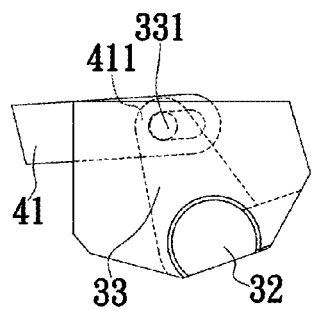
FIG. 3B illustrates the relative position between the linking rod first end and a first rotating shaft in FIG. 3.

Please refer to FIG. 1 and FIG. 2, and refer to FIG. 2A, FIG. 2B, FIG. 3, FIG. 3A, and FIG. 3B. FIG. 2A illustrates a relative position between the linking rod second end and the second rotating shaft in FIG. 2; FIG. 2B illustrates the relative position between the linking rod first end and a first rotating shaft; FIG. 3 illustrates a lateral view of the supporting apparatus in the first open state; FIG. 3A illustrates the relative position between the linking rod second end and the second rotating shaft in FIG. 3; FIG. 3B illustrates the relative position between the linking rod first end and a first rotating shaft in FIG. 3.

As shown in FIG. 2, when the supporting apparatus 1 is in the closed state S1, the connecting element 21 is hidden beneath the supporting element 31 and a supporting element folding angle $\theta_1$ is formed by the supporting element 31 and the linking rod 40. In this embodiment, the supporting element folding angle $\theta_1$ is about 5°; however, the present invention is not limited to that. The suitable range for the supporting element folding angle $\theta_1$ can be $0°\leq\theta_1\leq35°$. Please noted that, in order to identify the supporting element folding angle $\theta_1$ clearly, an axis 31a of the supporting element 31 and the axis 40a of the linking rod 40 are added for illustrating the supporting element folding angle $\theta_1$ formed by the supporting element 31 and the linking rod 40.

Furthermore, as shown in FIG. 2, the connecting element 21 and the linking rod 40 form a connecting element folding angle $\theta_2$. In this embodiment, the connecting element folding angle $\theta_2$ is about 15°, but the present invention is not limited to this degree. The suitable range for the connecting element folding angle $\theta_2$ can be $0°\leq\theta_2\leq75°$, and there are no corresponding angles between the supporting element folding angle $\theta_1$ and the connecting element folding angle $\theta_2$. Please noted that, in order to identify the connecting element folding angle $\theta_2$ clearly, the axis 21a of the connecting element 211 and the axis 40a of the linking rod 40 are added to illustrate the connecting element folding angle $\theta_2$ formed by the connecting element 21 and the linking rod 40.

When the supporting apparatus 1 is in the closed state S1, as shown in FIG. 2A and FIG. 2B, the guide pin 331 of the linking rod connecting portion 33 contacts a side of the hole 411 that is close to the second rotating shaft 22 (the left side in FIG. 2B). Under this condition, the guide pin 331 presses against the linking rod 40 and the linking rod 40 applies a clockwise torque to the connecting element 21. Because the clockwise torque is greater than the counter-clockwise torque applied by the torsion springs 24 to the connecting element 21, the connecting element 21 rotates toward the inside of the supporting apparatus 1. Therefore, as shown in FIG. 2A, the connecting element 21 is hidden beneath the supporting element 31 and is not exposed. As a result, the problem of the prior art that the connecting element is still exposed while the supporting apparatus is in the closed state can thus be solved.

When the supporting apparatus 1 of the present invention is being used, users only have to lift the supporting element 31 up in a clock-wise direction, and then the lifted supporting element 31 will rotate along the first rotating shaft 32 such that the supporting apparatus 1 rotates from the closed state S1 (FIG. 2) to the first open state S2 (FIG. 3).

As shown in FIG. 3, when the supporting element 31 rotates clockwise, the linking rod 40 consequently moves in the direction indicated by the arrow A. In addition, the movement of moving the linking rod 40 also causes the second rotating shaft 22 (FIG. 3A) to rotate such that the connecting element 21 rotates counter-clockwise to be exposed and the first open state S2, shown in FIG. 3, is formed. Furthermore, because the linking rod 40 moves in the direction indicated by the arrow A, the clockwise torque applied by the linking rod 40 to the connecting element 21 is smaller than the counter-clockwise torque applied by the torsion spring 24 to the connecting element 21. As a result, the connecting element 21 rotates counter-clockwise and then is exposed for connecting with the connecting element 21 and an electronic device by the torque of the torsion spring 24.

As shown in FIG. 3, in this embodiment, when the supporting apparatus 1 is in the first open state S2, the supporting element 31 and the linking rod 40 form a first supporting element opening angle $\theta_{11}$; the first supporting element opening angle $\theta_{11}$ is about 70°. The first connecting element opening angle $\theta_{21}$ between the connecting element 21 and the linking rod 40a is about 90°. However, the present invention is not limited to this; a suitable range for the first supporting element opening angle $\theta_{11}$ is 35°≤$\theta_{11}$≤90°, as long as the first connecting element opening angle $\theta_{21}$ is greater than the connecting element folding angle $\theta_2$. As the supporting apparatus 1 is rotating from the closed state S1 (FIG. 2) to the first open state S2 (FIG. 3), as shown in FIG. 3B, the guide pin 331 is situated within the hole 411 and always presses against a side of the hole 411 that is close to the second rotating shaft 22 (the left side in FIG. 2B).

Please refer to FIG. 3, and refer to FIG. 4, FIG. 4A, and FIG. 4B. FIG. 4 illustrates a lateral view of the supporting apparatus in the second open state; FIG. 4A illustrates the relative position between the linking rod second end and second rotating shaft in FIG. 4; FIG. 4B illustrates the relative position between the linking rod first end and a first rotating shaft in FIG. 4.

When the supporting apparatus 1 is in the first open state S2, the supporting apparatus 1 of the present invention can be connected with an electronic device 100 for supporting the electronic device 100 to form a state shown in FIG. 4. In this embodiment, the electronic device 100 is a tablet computer and the electronic device 100 comprises a first lateral surface 120 and a bottom surface 110.

As shown in FIG. 4, when an electronic device 100 is placed on the supporting apparatus 1, the connecting element 21 is embedded into the connecting hole of the first lateral surface 120 and the supporting element 31 touches against the bottom surface 110 of the electronic device 100. Due to the pull of gravity on the electronic device 100, the linking rod 40 moves to the left (moving in the direction indicated by the arrow B) and the connecting element 21 consequently rotates slightly clockwise (FIG. 4A) to provide a decent operating angle for users to form the second open state S3 of the supporting apparatus 1. At the same time, the connecting element 21 and the linking rod 40 form a second connecting element opening angle $\theta_{22}$, and in this embodiment, the second connecting element opening angle $\theta_{22}$ is about 50°. But the present invention is not limited to this embodiment; in fact, there is no particular angle relation between the connecting element folding angle $\theta_2$, the first connecting element opening angle $\theta_{21}$, and the second connecting element opening angle $\theta_{22}$, as long as the following criteria is met: the connecting element folding angle $\theta_2$≤the second connecting element opening angle $\theta_{22}$≤the first connecting element opening angle $\theta_{21}$.

As shown in FIG. 4, when the connecting element 21 rotates clockwise slightly (FIG. 4A), the linking rod 40 moves continuously in the direction indicated by the arrow B until the guide pin 331 contacts the side of the hole 411 that is close to the first rotating shaft 32 (the right side in FIG. 4B). It is noted that the movement of the linking rod 40 is a relative movement between the guide pin 331 and the hole 411 to release the idle motion of the linking rod 40. The range of the idle motion matches the width of the hole 411, and during the idle motion, the supporting element 31 does not have to rotate or move.

After the electronic device 100 is used, the electronic device 100 can be detached from the supporting apparatus 1. At this moment, because gravity no longer pulls the electronic device 100 down onto the supporting apparatus 1, the connecting element 21 is forced to rotate counter-clockwise due to the counter-clockwise torque caused by the torsion spring 24 such that the supporting apparatus 1 moves back to the first open state S2 (FIG. 3). The connecting element 21 and the linking rod 40 both rotate back to the first connecting element opening angle $\theta_{21}$, which is about 90° in this embodiment. Also, the linking rod 40 consequently moves right; the supporting element 31 and the linking rod 40 both return to the first supporting element opening angle $\theta_{11}$, which is about 70° in this embodiment.

Figure 5:
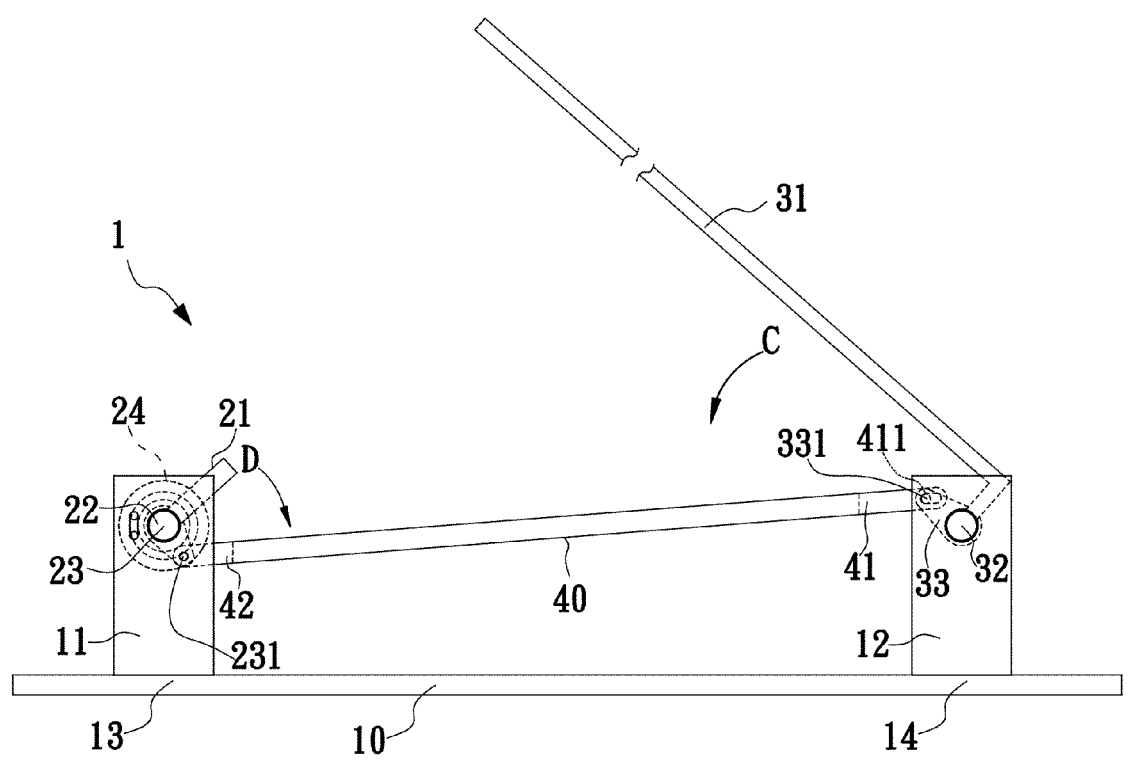
FIG. 5 is a lateral drawing to illustrate the supporting apparatus turning from the first open state to the closed state.

Please refer to FIG. 5, which is a lateral drawing to illustrate the supporting apparatus changing from the first open state to the closed state.

After the electronic device 100 is detached from the supporting apparatus 1, the supporting apparatus 1 returns to the first open state S2 shown in FIG. 3. Users can apply force to the supporting element 31 to allow the supporting element 31 to rotate counter-clockwise (the direction indicated by the arrow C in FIG. 5); then the movement of the linking rod 40 enhances the clockwise torque because the second end 42 of the linking rod 40 is applied to the connecting element 21 to resist the counter-clockwise torque from the torsion springs 24 applied to the connecting element 21. As a result, the connecting element 21 rotates clockwise again (the direction indicated by the arrow D in FIG. 5) and is hidden beneath the supporting element 31 to form the closed state S1 of the supporting apparatus 1 shown in FIG. 2.

It must be noted that the above-mentioned embodiments are only for illustration. It is intended that the disclosure covers modifications and variations of this disclosure provided that they fall within the scope of the following claims and their equivalents. Therefore, it will be apparent to those skilled in the art that various modifications can be made to the structure of the disclosure without departing from the scope or spirit of the disclosure.

What is claimed is:

1. A supporting apparatus for supporting an electronic device, wherein the electronic device comprises a bottom surface and a first lateral surface, the supporting apparatus comprising:
    a base, comprising a front end and a rear end;
    a device supporting portion, comprising:
        a supporting element; and
        a first rotating shaft, pivotally connected to the rear end of the base and connected with the supporting element for allowing the supporting element to rotate along the first rotating shaft, such that the supporting apparatus has a closed state and a first open state;
    a device connecting portion, comprising:
        a connecting element configured to be matched with a built-in connector of the electronic device;
        a second rotating shaft, pivotally connected to the front end of the base and the connecting element located on the second rotating shaft; and
        two torsion springs, respectively wrapped at the two ends of the second rotating shaft; and
    a linking rod, comprising:
        a first end, pivotally connected to the first rotating shaft; and
        a second end, pivotally connected to the second rotating shaft;
    wherein, when the supporting apparatus is in the closed state, the supporting element and the linking rod formed a supporting element folding angle $\theta_1$, wherein 0°≤$\theta_1$≤35°; meanwhile, the connecting element and the linking rod formed a connecting element folding angle $\theta_2$ wherein 0°≤$\theta_2$≤75°;
    when the supporting apparatus rotates from the closed state to the first open state, the supporting element and the linking rod form a first supporting element opening angle $\theta_{11}$, wherein 35°≤$\theta_{11}$≤90°; the connecting element and the linking rod form a first connecting element opening angle $\theta_{21}$, wherein $\theta_{21}$>$\theta_2$ for allowing the connecting element to connect with the first lateral surface of the electronic device and the supporting element to contact the bottom surface.

2. The supporting apparatus as claimed in claim 1, wherein the first supporting element opening angle $\theta_{11}$ is substantially 70°.

3. The supporting apparatus as claimed in claim 2, wherein the first connecting element opening angle $\theta_{21}$ is substantially 90°.

4. The supporting apparatus as claimed in claim 1, wherein after the first lateral surface connects with the connecting element, the supporting apparatus rotates from the first open state to a second open state, and the connecting element and the linking rod form a second connecting element opening angle $\theta_{22}$, wherein $\theta_2 \le \theta_{22} \le \theta_{21}$.

5. The supporting apparatus as claimed in claim 4, wherein the first supporting element opening angle $\theta_{11}$ is substantially 70°.

6. The supporting apparatus as claimed in claim 5, wherein the first connecting element opening angle $\theta_{21}$ is substantially 90°.

7. The supporting apparatus as claimed in claim 4, wherein the second connecting element opening angle $\theta_{22}$ is smaller than 90°.

8. The supporting apparatus as claimed in claim 7, wherein the first supporting element opening angle $\theta_{11}$ is substantially 70°.

9. The supporting apparatus as claimed in claim 8, wherein the first connecting element opening angle $\theta_{21}$ is substantially 90°.

10. The supporting apparatus as claimed in claim 4, wherein the device supporting portion further comprises a linking rod connecting portion, wherein the first end connects with the first rotating shaft via the linking rod connecting portion.

11. The supporting apparatus as claimed in claim 10, wherein the first supporting element opening angle $\theta_{11}$ is substantially 70°.

12. The supporting apparatus as claimed in claim 11, wherein the first connecting element opening angle $\theta_{21}$ is substantially 90°.

13. The supporting apparatus as claimed in claim 10, wherein the linking rod connecting portion further comprises a guide pin; the first end further comprises a hole, and the guide pin is located in the hole.

14. The supporting apparatus as claimed in claim 13, wherein the first supporting element opening angle $\theta_{11}$ is substantially 70°.

15. The supporting apparatus as claimed in claim 14, wherein the first connecting element opening angle $\theta_{21}$ is substantially 90°.

16. The supporting apparatus as claimed in claim 13, wherein the device connecting portion further comprises a linking rod pivoting portion, wherein the second end is pivotally connected to the second rotating shaft via the linking rod pivoting portion; the base further comprises a first connecting portion situated at the front end and a second connecting portion situated at the rear end, wherein the first connecting portion is pivotally connected to the second rotating shaft and the second connecting portion is pivotally connected to the first rotating shaft.

17. The supporting apparatus as claimed in claim 16, wherein the supporting element folding angle $\theta_1$ is substantially smaller than 20°.

18. The supporting apparatus as claimed in claim 17, wherein the connecting element folding angle $\theta_2$ is substantially smaller than 20°.

19. The supporting apparatus as claimed in claim 18, wherein the first supporting element opening angle $\theta_{11}$ is substantially 70°.

20. The supporting apparatus as claimed in claim 19, wherein the first connecting element opening angle $\theta_{21}$ is substantially 90°.

* * * * *